US005755074A

United States Patent [19]

Fetters

[11] Patent Number: 5,755,074

[45] Date of Patent: May 26, 1998

[54] SELF-ADJUSTING DOWN-ARTICLE INDICATOR FOR A PACKAGING MACHINE

[75] Inventor: Shawn M. Fetters, Deerwood, Minn.

[73] Assignee: Riverwood International Corporation, Atlanta, Ga.

[21] Appl. No.: 828,272

[22] Filed: Mar. 21, 1997

Related U.S. Application Data

[60] Provisional application No. 60/018,893 May, 31, 1996.

[51] Int. Cl.[6] .......................... B65B 57/08; B65B 59/02; B07C 5/34; B65G 43/08

[52] U.S. Cl. .................................. 53/69; 53/53; 53/201; 53/504; 53/493; 198/395

[58] Field of Search .................................. 53/53, 54, 52, 53/69, 67, 64, 504, 500, 498, 493, 77, 201; 198/395

[56] References Cited

U.S. PATENT DOCUMENTS

| | | | |
|---|---|---|---|
| 3,031,811 | 5/1962 | Monroe et al. | 53/201 X |
| 3,433,966 | 3/1969 | Letch et al. | 198/395 X |
| 3,481,105 | 12/1969 | Hageline | 53/506 X |
| 3,506,840 | 4/1970 | Fink | 198/395 X |
| 3,724,641 | 4/1973 | Wainwright et al. | 198/395 |
| 3,730,325 | 5/1973 | Goodwin | 198/395 |
| 5,035,101 | 7/1991 | Wakabayashi et al. | 53/53 |

*Primary Examiner*—James F. Coan

*Attorney, Agent, or Firm*—Joel D. Skinner, Jr.; Steve M. McLary

[57] ABSTRACT

A down-article indicator which automatically adjusts for the height difference of articles, such as bottles, when article size is changed for a new run on a machine conveying articles. A pivotably mounted height sensing arm, located on one lane of the machine, down stream from an array of freely pivoting detecting arms, is connected by an adjustable mechanical linkage to a pivoting bracket holding a retro-reflective photo eye in proper location with respect to the detecting arms so that the detecting arms do not break a light beam from the photo eye during normal operation. A non-upright article will cause a detecting arm to pivot and break the light beam to stop the machine. As a new group of articles having a different height moves into the down-article indicating station, the height sensing arm automatically moves the photo eye to its proper location for the new height articles. The machine has a "prime" mode which overrides a stop signal which may be sent by the photo eye while the transition between groups of articles passes through the station.

25 Claims, 6 Drawing Sheets

SELF-ADJUSTING DOWN-ARTICLE INDICATOR FOR A PACKAGING MACHINE

CROSS-REFERENCE TO RELATED APPLICATIONS

This application claims the benefit, under 35 U.S.C. 119(e), of U.S. provisional application Ser. No. 60/018,893, filed May 31, 1996, pending.

BACKGROUND OF THE INVENTION

1. Field of the Invention

The present invention relates, generally, to packaging machines and methods. More particularly, the invention relates to a down article detector for use with packaging machines. However, the invention also may be found to have utility in other applications.

2. Background Information

In a typical packaging machine for placing groups of articles, such as bottles or cans, within individual cartons, articles to be packaged are fed in mass into one end of the machine. The machine erects a carton, groups and positions articles to be placed in the carton, brings the group of articles and carton together, then closes and seals the carton, and dispenses it out the other end of the machine.

At the in-feed end of a packaging machine, articles are typically fed in mass by a conveyor into lanes or tracks. Articles are typically packed tightly together and are standing on end. If a bottle or can tips over in one of these tracks, it may disrupt the entire packaging process. The machine must be stopped and the fallen or "down" article reset. It is desirable to detect a fallen article early in the process as possible and stop the machine as soon as possible. Since bottles are inherently less stable than cans, bottle packaging machines experience a down article more frequently than can packaging machines. While the subsequent discussion is about bottle packaging, the problem and the solution offered by the present invention are also applicable to machines which package cans or other articles.

The apparatus of the present invention is well suited for use in a packaging machine disclosed in a pending U.S. patent application entitled "Packaging Machine Having Overhead Assembly For Opening and Lowering Cartons Onto Article Groups" filed in the name of Colin P. Ford, Allen L. Olson and James W. Emerson, said application being assigned to Riverwood International Corporation, the assignee of this application. The above application is hereby incorporated by reference.

A prior art down-bottle indicator is shown in FIG. 1. Bottles 90 in a tightly packed stream are moved on a conveyor 96 in lanes A and B between guide rails 98 and vertical wall 118. For each lane A and B of bottles 90, a freely pivoting arm 140 hangs from a support 150. Bolts 152 secure support 150 to brackets 154 which are fastened to vertical wall 118. The lower end 141 of the arm 140 is curved and has a flange 144 which rides on the tops 94 of the bottles 90 as the stream of bottles passes under it. A retro-reflective photo eye 160 is positioned on photo eye mount 162 so that a light beam 161 emitted from photo eye 160 will just miss edge 147 on end 146 of arms 140, reflect off of reflector 180, and return to photo eye 160 to maintain photo eye 160 in an "on" state. Photo eye 160 functions as a stop device to stop conveyor 96, and preferably the rest of the packaging machine, when the light beam 161 is interrupted. If all is well, the arms 140 remain essentially stationary since the tops 94 of all the bottles 90 passing under them are the same height as illustrated in lane B. If a bottle 92 falls over and is lying down in the lane, as shown in lane A, the lower end 141 of arm 140 drops onto the down bottle 92. The other end 146 of the arm 140 pivots up and disrupts the light beam 161 between photo eye 160 and reflector 180 which stops the machine.

A packaging machine may have more lanes for articles than the two lanes shown in FIG. 1, and each lane would have an arm 140. Arms 140 move independently of each other, and any one can break the light beam 161. Arms 140 are aligned and the position of the photo eye 160 relative to arms 140 is set so that light beam 161 from photo eye 160 reflects off of reflector 180 and returns to photo eye 160 just missing edge 147 of arms 140. Normal movement of the arms 140 between upright bottles 90 will disrupt the light beam 161, but greater movement of the arm will disrupt it.

In the past a particular packaging machine could be dedicated to one size bottle. However, since packaging machines have become more sophisticated and consequently more expensive, there is a need for one machine to have the capability of processing a large range of bottle sizes. Each time a run is to be made with a different height bottle, support 150 with photo eye mount 162, photo eye 160, reflector 180, and arms 140 attached is raised or lowered to keep arms 140 in proper position on tops of bottles 90 and to maintain the relative position of the photo eye 160 with respect to edge 147 of arms 140. Brackets 154 are loosened from vertical wall 154, support 150 and the entire apparatus attached to it is raised or lowered to the desired position, then brackets 154 are tightened again. For each bottle height there may be an indexing slot (not shown) or other such device for vertically locating support 150. Moving of the down-bottle indicator in this manner requires stopping the machine each time an adjustment is made.

Changing the machine to accommodate different bottle sizes should be simple, fast, and accurate. It is desirable to simply load the new size bottles into the machine behind the old bottles and have the machine accommodate them with minimum effort required by the operator to reset the machine. The prior art manual method of moving the down-bottle indicator assembly is undesirable on such a machine.

Despite the need in the art for a down-bottle indicator which overcomes the disadvantages, shortcomings and limitations of the prior art, none insofar as is known has been developed. Accordingly, it is an object of the present invention to provide an improved down-bottle indicator which automatically adjusts for different bottle heights, thereby eliminating the need for manual adjustment.

BRIEF SUMMARY OF THE INVENTION

The apparatus of the present invention provides a down-bottle indicator for a packaging machine which automatically adjusts for the height difference of different size bottles when bottle size is changed for a new run.

The apparatus includes a pivotably mounted height sensing arm located on one lane of a bottle packaging machine down stream from an array of freely pivoting detecting arms. The detecting arms are well known in the art and activate a sensor, typically by breaking a light beam, when a down bottle causes them to pivot out of their normal position. The present invention controls the position of the sensor with respect to the detecting arms by mounting the sensor on a movable bracket and connecting that bracket to the height sensing arm with an adjustable mechanical linkage. When the machine is running normally, the height of the sensing and detecting arms is the same since all the bottles are standing and are the same height. The height sensing arm positions the sensor so that the detecting arms do not activate it during normal operation. If a bottle is down upstream of the down-bottle indicator it will reach a detecting arm causing it to pivot, activate the sensor, and stop the machine before the down bottle reaches the sensing arm.

While prior art down-bottle indicators require manual movement of the down-bottle indicator each time the machine is changed to run a different height bottle, the present invention eliminates that adjustment. With the present invention, the new bottle height causes the detecting arms to pivot up or down depending on whether the new bottles are taller or shorter than the previous ones. This much motion could normally activate the sensor, but the machine can have a "prime" mode which overrides the stop signal generated by the sensor while the new height bottles are passing through the down-bottle indicating station. When the new bottles reach the height sensing arm, the arm pivots up or down causing the linkage to move the sensor into proper position for the new height bottles, and the down bottle indicator can now function normally.

The features, benefits and objects of this invention will become clear to those skilled in the art by reference to the following description, claims and drawings.

DETAILED DESCRIPTION

Figure 1:
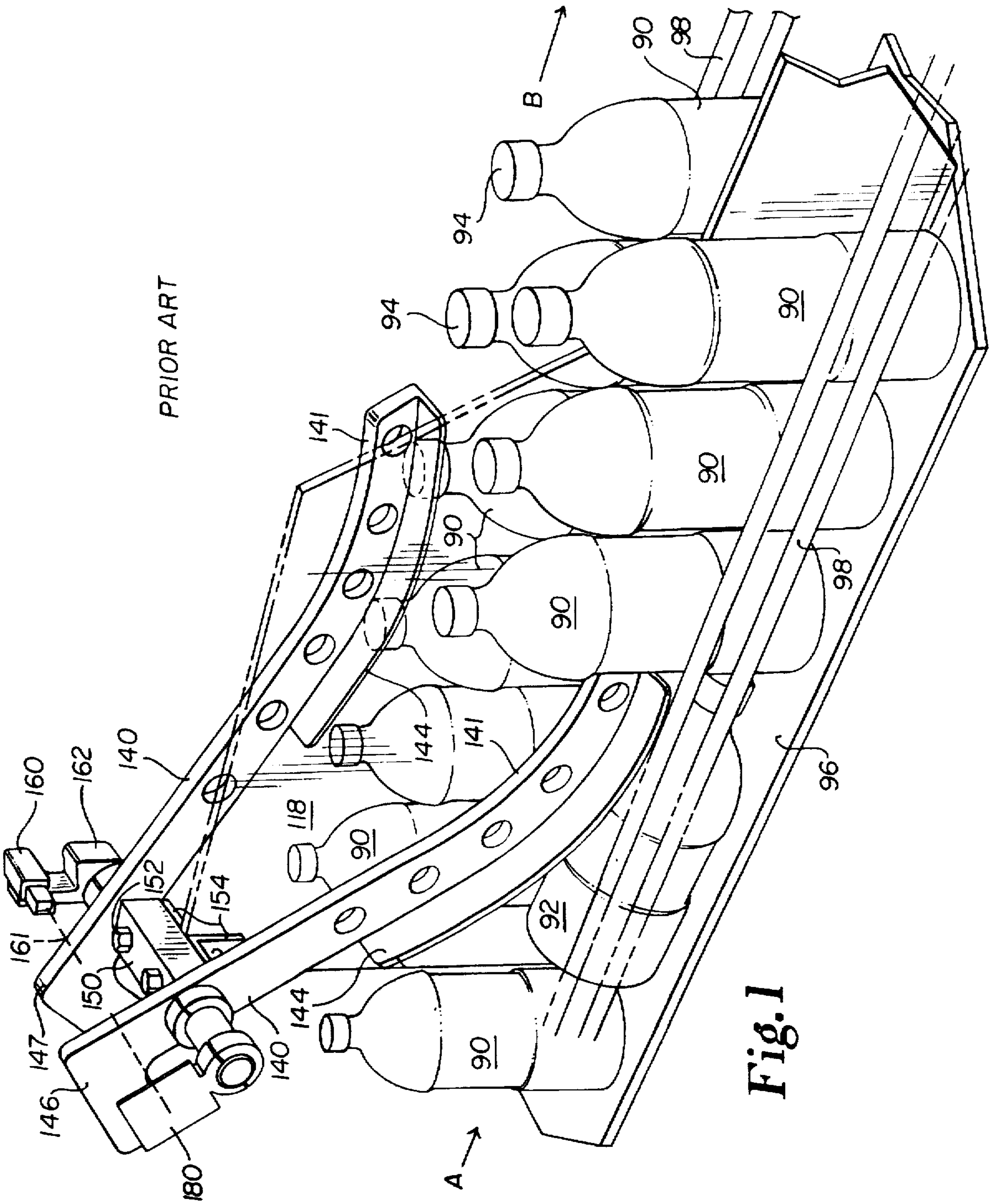
FIG. 1 is a perspective view of a prior art down article indicator.
Figure 2:
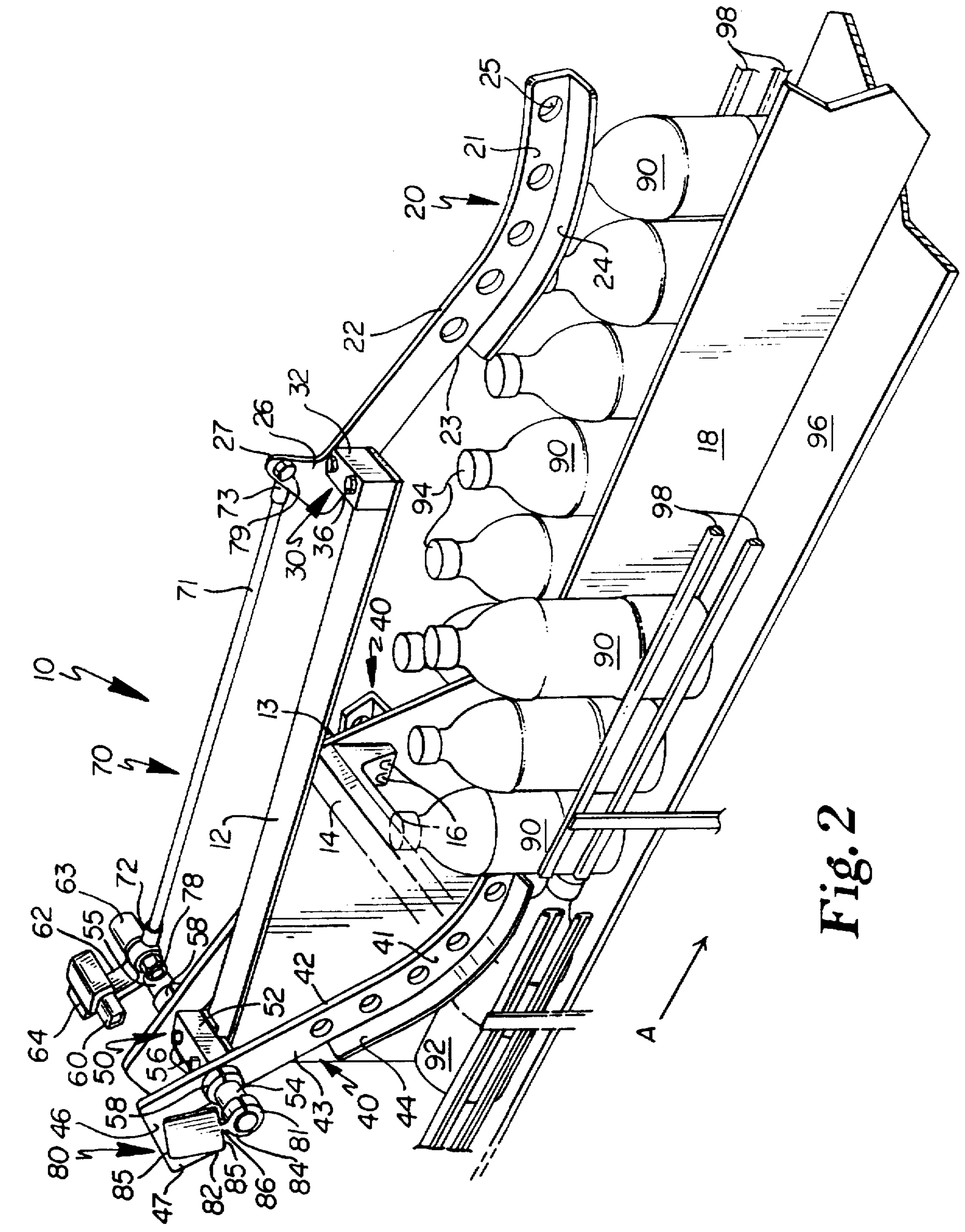
FIG. 2 is a perspective view of the down article indicator of the present invention.

Referring to FIG. 2, an example of the preferred embodiment of the present invention is illustrated and generally indicated by the reference numeral 10. Bottles 90 in a tightly packed stream are moved in a direction indicated by arrow A on a conveyor 96 in lanes between guide rails 98 and vertical wall 18. The down bottle indicator assembly 10 has a mounting base 12 which supports a pivoting sensing arm 20 at a downstream end and at least one pivoting detecting arm 40 and a photo eye 60 attached to a pivoting photo eye mount 62 at an upstream end. Mounting base 12 separates sensing arm 20 and detecting arms 40 by some distance, which in the preferred embodiment is about 18 inches. Sensing arm 20 and detecting arms 40 are curved and ride on the tops 94 of the bottles 90 as the stream of bottles passes under them. A retroreflective photo eye 60 is positioned on photo eye mount 62 so that a light beam 61 emitted from photo eye 60 will just miss enlarged potion 47 of arms 40, reflect off of reflector 80, and return to photo eye 60 to maintain photo eye 60 in an "on" state. Photo eye 60 functions as a stop device to stop conveyor 96, and preferably the rest of the packaging machine, when the light beam 61 is interrupted. The photo eye mount 62 of the present invention pivots on detecting arm mount 50. Adjustable linkage 70 connects pivoting sensing arm 20 and pivoting photo eye mount 62. As the sensing arm 20 encounters bottles of a different height such as for a new run of different size bottles, it pivots and, through linkage 70, causes photo eye mount 62 to also pivot to keep photo eye 60 properly positioned with respect to detecting arms 40 for the new height bottles. Other types of mounts for photo eye 60 which provide motion other than pivoting motion, such as a slider providing sliding motion, when connected to linkage 70 are also within the scope of this invention.

Figures 3, 4:
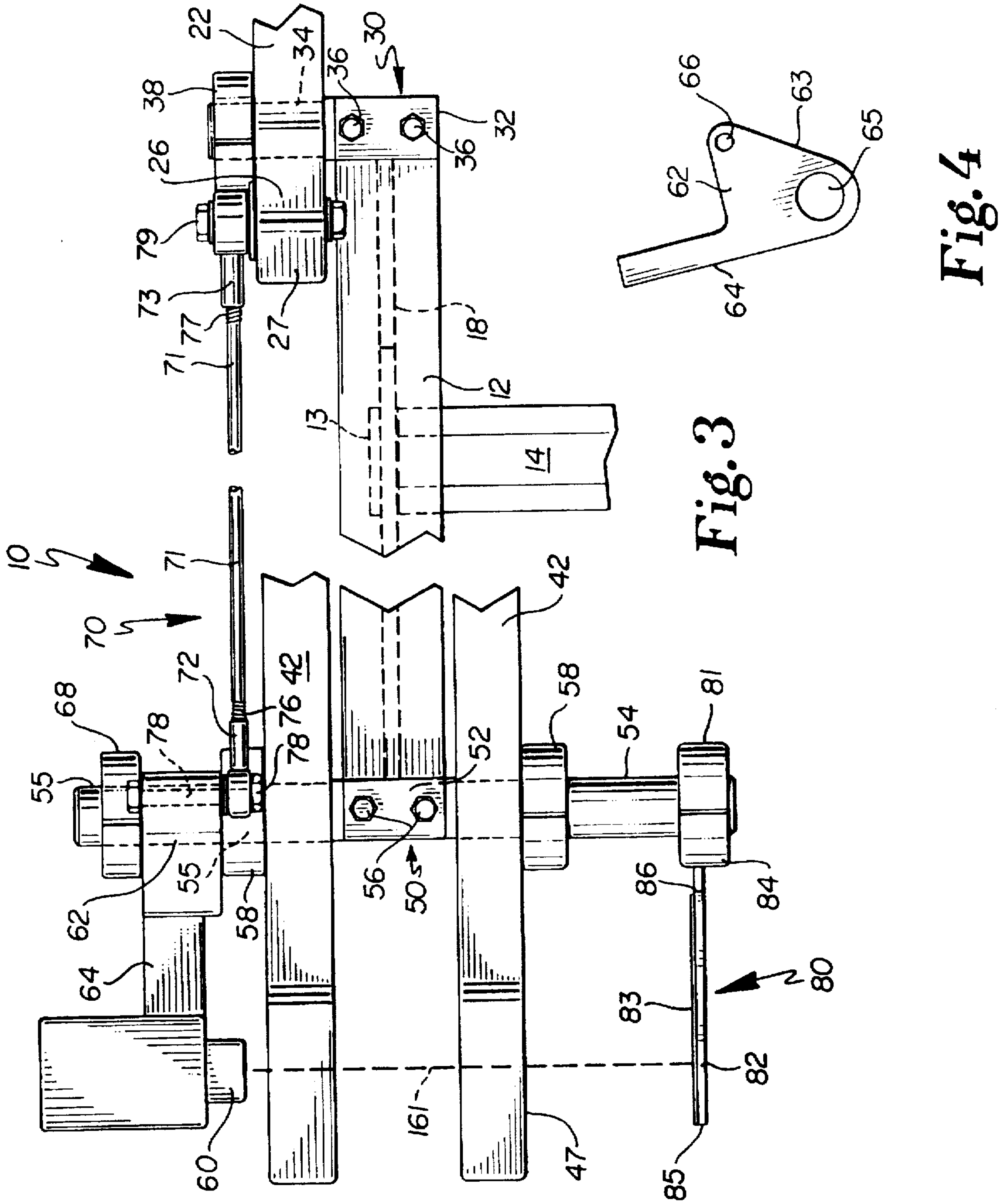
FIG. 3 is a top view of the mechanism shown in FIG. 2.
FIG. 4 is a side view of the photo eye mount.

Referring to FIGS. 2 and 3, to attach mounting base 12 to a packaging machine, in the preferred embodiment mounting base 12 has an attachment plate 13 extending downward from mounting base 12. Attachment plate 13 has holes (not shown) which receive fasteners 16 for fixedly attaching attachment plate 13 to a vertical wall 18 between lanes of bottles. Bracket 14 is attached to a frame member (not shown) of the machine and supports vertical wall 18. Attachment plate 13 aligns with bracket 14, and both bracket 14 and attachment plate 13 use the same fasteners 16 to secure them to vertical wall 18.

Sensing arm 20 has a curved portion 21 for approximately half its length. Sensing arm 20 has an inner curved edge 22 and an outer curved edge 23. Curved portion 21 has a flange 24 along the its outer curved edge 23. Sensing arm 20 may have a plurality of lightening holes 25 to reduce its mass and inertia. In the preferred embodiment sensing arm 20 has a 13.5 inch overall length, and flange 24 has a 10 inch outer radius and a 1.75 inch width. Opposite curved portion 21 is pivoting end 26 which has an enlarged portion 27 which extends transversely from inner curved edge 22. Enlarged portion 27 has a hole (not shown) which receives a bolt 79 connecting linkage assembly 70 to sensing arm 20. A helicoil may be inserted in the hole (not shown) in enlarged portion 27 to allow bolt 79 to thread directly into enlarged portion 27. Pivoting end 26 has a pivot hole (not shown) near enlarged portion 27 which receives sensing arm mount 30 and allows sensing arm 20 to pivot freely on sensing arm mount 30.

Sensing arm mount 30 has a mounting portion 32 and a spindle portion 34. In the preferred embodiment, mounting portion 32 has a rectangular or square cross section and has two holes (not shown) which receive bolts 36 securing sensor arm mount 30 to mounting base 12. Sensing arm mount 30 is positioned on mounting base 12 such that spindle portion 34 is cantilevered transversely from mounting base 12. Spindle portion 34 has a round cross section of diameter slightly smaller than the pivot hole in sensing arm 20. In the preferred embodiment the difference is 0.017 inches. Clamp collar 38 attaches to spindle portion 34 beyond sensing arm 20 and captures sensing arm 20 on spindle portion 34 of sensing arm mount 30.

Detecting arms 40 are similar to sensor arm 20. Curved portion 41 of detecting arm 40 with inner curved edge 42, outer curved edge 43, flange 44 and lightening holes 45 is identical to curved portion 21 of sensing arm 20 and its corresponding features. The pivot hole (not shown) of detecting arm 40 is in the same position with respect to flange 44 and lightening holes 45 as the pivot hole is with respect to flange 24 and lightening holes 25 of sensing arm 20. Pivoting end 46 of detecting arm 40 has a much larger enlarged portion 47 extending farther beyond the pivot hole and transversely from outer curved edge 43, which is the opposite direction as enlarged portion 27 of sensing arm 20.

Sensing arm 20 and detecting arms 40 are preferably made of plastic, such as ultra high molecular weight polyethylene.

Detecting arm mount 50 has a center mounting portion 52 and two spindle portions 54 and 55 extending in opposite directions from center mounting portion 52. In the preferred embodiment, center mounting portion 52 is the same as mounting portion 32 of sensing arm mount 30 having a rectangular or square cross section and two holes (not shown) which receive bolts 56 securing detecting arm mount 50 to mounting base 12. Detecting arm mount 30 is positioned on mounting base 12 such that both spindle portion 54 and 55 are cantilevered transversely in opposite directions from mounting base 12. Spindle portions 54 and 55 have round cross sections of diameter slightly smaller than the pivot hole in detecting arm 40. In the preferred embodiment the difference is 0.017 inches. Clamp collars 58 attach to spindle portions 54 and 55 beyond detecting arms 40 and capture detecting arms 40 on spindle portions 54 and 55 of detecting arm mount 50.

A photo eye 60, preferably a retro-reflective type photo eye, is fixedly attached to photo eye mount 62 which pivots on spindle portion 55 of detecting arm mount 50. Photo eye 60 is mounted on photo eye mount 62 such that a light beam 61 emitted from photo eye 60 shoots above and across enlarged portion 47 of detecting arms 40, reflects off of reflector 80 and returns to photo eye 60. Clamp collar 68 is attached to spindle portion 55 to capture photo eye mount 62 on spindle portion 55 between clamp collar 58 and clamp collar 68. In the embodiment shown in FIGS. 2 and 3, only two detecting arms are present for two lanes of bottles. Photo eye mount 62 is located outboard from clamp collar 58 which captures one of the detecting arms 40 so that photo eye 60 "sees" across both detecting arms 40. If more than two detecting arms were used for more than two lanes of bottles, photo eye mount 60 would be mounted outboard of all the detecting arms 40 so that it "sees" across all detecting arms 40.

Referring to FIG. 4, in the preferred embodiment, photo eye mount 62 has a generally triangular shaped pivot portion 63 and a rectangular leg portion 64 which extends from one of the apexes of the triangular shaped pivot portion 63. Near another apex, pivot portion 63 has a hole 65 which receives spindle portion 55 of detecting arm mount 50. Near the last apex, pivot portion 63 has a hole 66 which receives bolt 78 from linkage 70. Hole 66 may be threaded to allow bolt 78 to thread directly into pivot portion 63. Photo eye 60 is attached to leg portion 64. Hole 65 is the same diameter as the pivot hole in detecting arm 40 so that photo eye mount will freely pivot on spindle portion 55 of detecting arm mount 50.

Referring to FIGS. 2 and 3, adjustable linkage 70 connects sensing arm 20 to photo eye mount 62. Adjustable linkage 70 comprises a rod 71, with rod ends 72 and 73 threadably attached at each end of rod 71. Bolt 78 passes through rod end 72 and engages hole 66 in photo eye mount 62. Bolt 79 passes through rod end 73 and engages the hole (not shown) in enlarged portion 27 of sensing arm 20. Rod end 72 preferably has left-hand threads and rod end 73 preferably has right-hand threads. Rod 71 has threaded end portions 76 and 77 respectively which preferably are approximately 7/8 inch long and cooperate with threaded rod ends 72 and 73 respectively. Threaded portion 76 is left-hand threaded and threaded portion 77 is right-hand threaded to allow the length of adjustable linkage 70 to be shortened or lengthened adjusted by rotating rod 71 without removing rod end 72 from photo eye mount 62 or rod end 73 from sensing arm 20.

In the preferred embodiment the attachment locations for rod ends 72 and 73 on photo eye mount 62 and sensing arm 20 align to allow rod 71 to be straight, as is best shown in FIG. 3. However, if the location of sensing arm 20 and photo eye mount 62 were transversely offset, or if guards or other members of the packaging machine interfere with the preferred attachment location of rod ends 72 and 73 on photo eye mount 62 and sensing arm 20, rod ends 72 or 73 may have to be attached to opposite sides of photo eye mount 62 or sensing arm 20 respectively from those illustrated. Such attachment may require that rod 71 be bent which may prevent the length of linkage 70 from being adjusted simply by rotating rod 71. Bolt 78 or 79 would have to be removed and one of the rod ends rotated. In that case, having left and right hand threads on rod 71 offer no advantage, and both threaded portions 76 and 77 may be right hand threaded.

Reflector 80 attaches to spindle portion 54 of detecting arm mount 50 and reflects light beam 61 from photo eye 60 back to photo eye 60. Reflector 80 has a clamping portion 81, a wall portion 82, and a reflecting surface 83. Clamping portion 81, in the preferred embodiment is a stainless steel clamp collar which securely clamps on to spindle portion 54 of detecting arm mount 50. Wall portion 82 in the preferred embodiment is a rectangular stainless steel plate approximately 3 inches by 2⅞ inches and ⅛ inch thick. Clamping portion 81 and wall portion 82 are joined in the preferred embodiment by welding outer edge 84 of clamping portion 81 to one of the 2⅞ inch long edges 85 of wall portion 82 at the midpoint 86 of edge 85 such that clamping portion 81 and wall portion 82 are planar. Wall portion 82 has reflecting surface 83, such as a photo eye reflector, attached to it so that reflecting surface 83 faces photo eye 60 when reflector 80 is installed on detecting arm mount 50. Reflecting surface 83 is large enough to encounter light beam 61 emitted from photo eye 60 at all times when photo eye 60 moves through its normal range of motion as photo eye mount 62 pivots on spindle portion 55 of detection arm mount 50. Reflector 80 can be positioned clockwise or counterclockwise on spindle portion 54 of detection arm mount 50 to optimize the position of reflecting surface 83 relative to photo eye 60 when reflector 80 is clamped in place.

Sensing arm mount 30, detecting arm mount 50, linkage 70 and reflector 80 are all preferably made of stainless steel.

Figure 5:
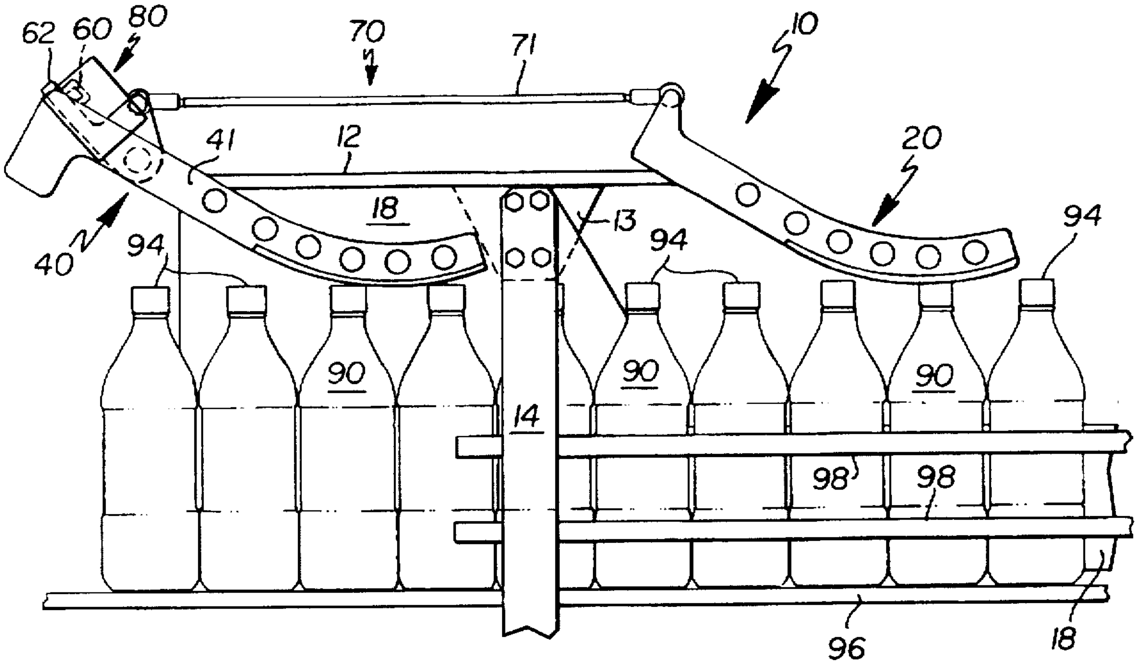
FIG. 5 is a side view of the down article indicator of the present invention shown in normal opparation as bottles of all one height are processed.

Referring to FIGS. 2, 3, and 5, in operation, flange 24 of sensing arm 20 and flange 44 of detecting arms 40 ride across the tops 94 of bottles 90 moving on a conveyor 96 below down bottle indicator 10. A light beam 61 emitted from photo eye 60 reflects off of reflecting surface 83 of reflector 80 and returns to photo eye 60 to keep photo eye 60 in "on" mode, which keeps the packaging machine running. If a bottle falls down upstream from down bottle indicator assembly 10, it will first be encountered by one of the detecting arms 40. The curved portion 41 of that detecting arm 40 will pivot downward as flange 44 falls from the top 94 of the previous upright bottle 90 to the side of the fallen bottle 92. The downward pivoting of curved portion 41 raises enlarged portion 47 into a position that blocks the light emitted from photo eye 60 thereby disrupting light beam 61 which stops the packaging machine so that the down bottle 92 can be removed. The position of photo eye 60 with respect to enlarged portion 47 of detecting arms 40 is such that during normal running, slight pivoting of detecting arms as flange 44 goes from upright bottle 90 to upright bottle 90 will not trip photo eye 60, but any greater pivoting from a down or partially down bottle will trip it every time. If photo eye 60 is positioned too far away from enlarged portion 47 of detecting arms 40 while detecting arms 40 are in normal running position, a completely down bottle 92 may be detected because a detecting arm 40 encountering it pivots a large amount, but a partially down bottle may not be detected as a detecting arm 40 encountering it pivots only a small amount. Therefore it is important that photo eye 60 be positioned so that the beam of light emitted from photo eye 60 passes close to enlarged portion 47 of detecting arms 40.

The length of adjustable linkage 70 is adjusted by rotating rod end 72 and/or rod end 73 on rod 71 so that light emitted from photo eye 60 will strike and reflect off of reflector 80 for a wide range of bottle heights to be processed. Once this adjustment has been made, it is not necessary to reset this adjustment unless bottles to be processed are taller or shorter than the range for which the adjustment has been set. The self adjusting down article indicator will automatically adjust for any group of articles having a height within the range set without the machine having to be stopped to manually make such an adjustment.

Within the scope of this invention, other means for detecting movement of arms 40 may be employed. A mechanical switch could be positioned near enlarged portion 47 of each detecting arm 40 which is tripped if arm 40 pivots down too much. A similar arrangement using non-contact proximity sensors having a very short actuation field could also be used. Both of those arrangements, however, require multiple switches or sensors and additional support structures for them. A single proximity sensor having a large field could be used to detect penetration of any of arms 40 into its field, however, such a device is not well suited to detect the relatively small movement of enlarged portion 47 of arms 40 into its large field. Because of its narrow beam and long field, a photo eye is the preferred type of sensor. A retro-reflective type photo eye is the preferred type of photo eye because, unlike a through-beam type, it does not have a separate receiving unit which must be attached and wired to the machine and which is susceptible to damage.

To run a group of bottles having a different height than the previous group, prior art down bottle indicators require moving the entire down-bottle indicator to a different vertical position to keep the beam of light emitted from photo eye 60 close to enlarged portion 47 of detection arms 40 for the new-height bottles. Such adjustment necessitates stopping the packaging machine every time an adjustment is to be made.

Figure 6:
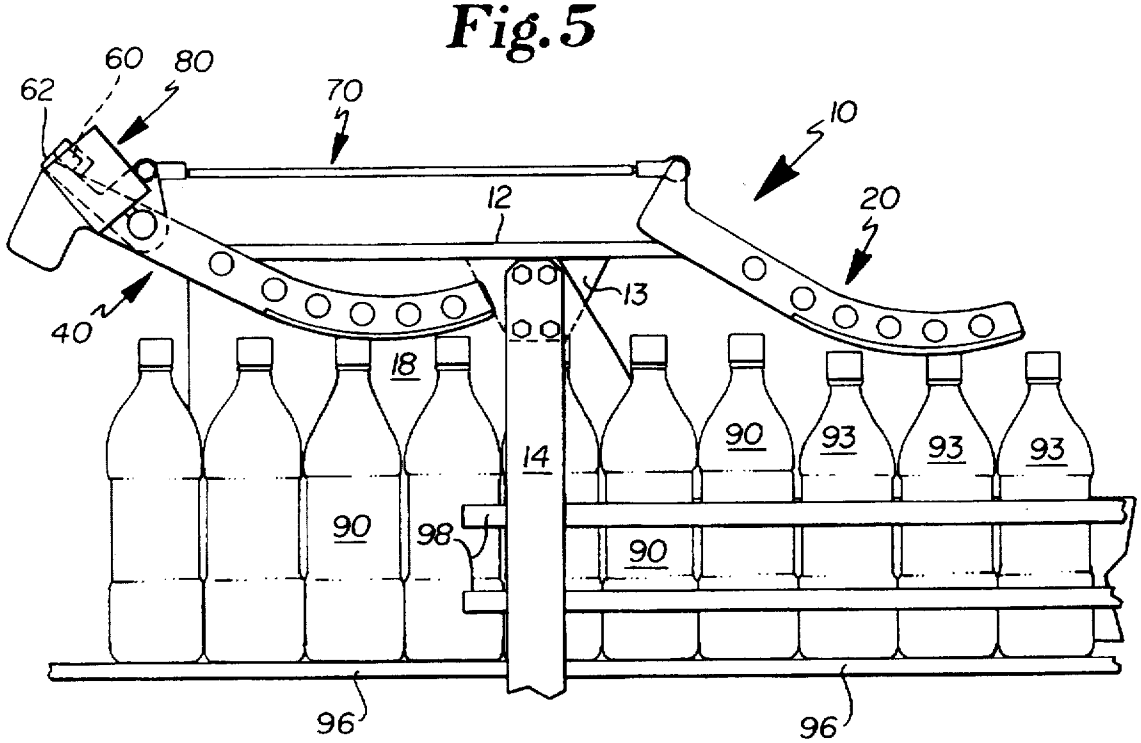
FIG. 6 is a side view of the down article indicator of the present invention showing how it automatically adjusts as a group of taller bottles are processed immediately behind previous bottles.
Figure 7:
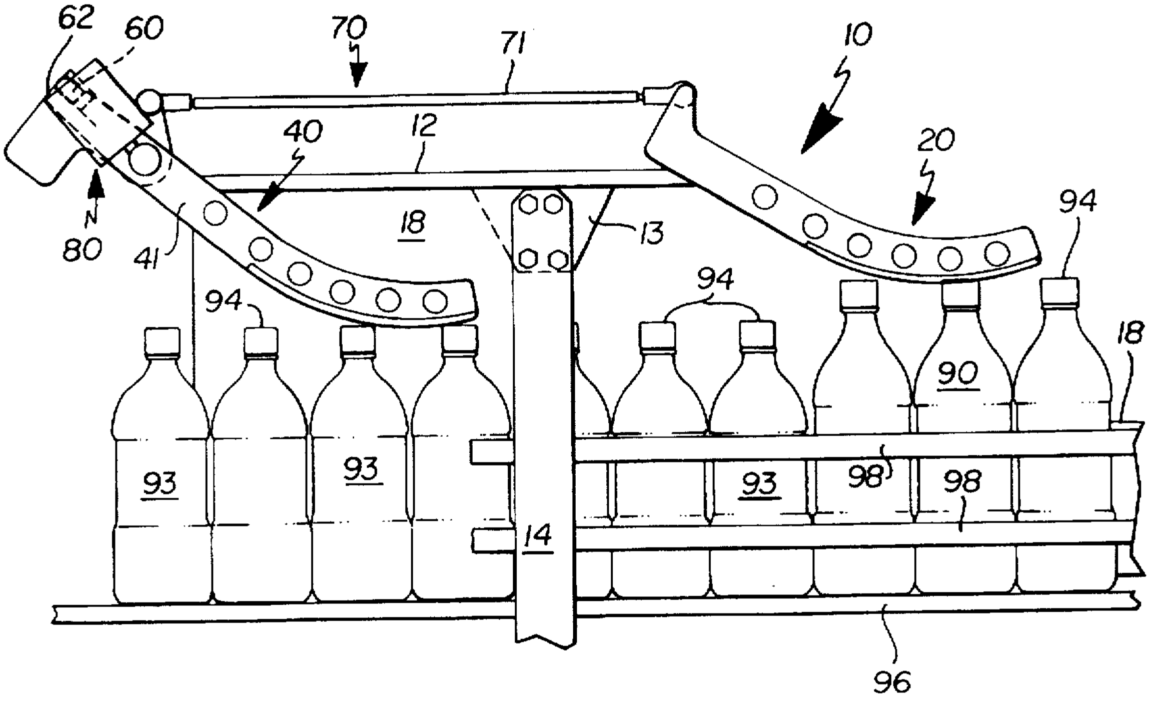
FIG. 7 is a side view of the down article indicator of the present invention showing how it automatically adjusts as a group of shorter bottles are processed immediately behind previous bottles.

Referring to FIGS. 6 and 7, with an apparatus of the present invention, to run a group of bottles having a different height than the previous group, the new group is fed into the machine behind the previous group and the down bottle indicator assembly 10 automatically adjusts for the height difference without having to stop the machine. Sensing arm 20 and linkage 70 pivot photo eye mount 62 to keep photo eye 60 properly positioned with respect to detecting arms 40 as long as sensing arm 20 and detecting arms 40 are encountering bottles of the same height.

Referring to FIG. 6, if the new bottles are taller than previous bottles, the taller bottles 91 cause detecting arms 40 to pivot upward before sensing arm 20 encounters the taller bottles 91. Detecting arms 40 pivoting this direction do not interrupt light from photo eye 60, so the machine will continue to run as the taller bottles 91 progress through. At this point, however, photo eye 60 is positioned farther from detecting arms 40 than desired. When the taller bottles 91 reach sensing arm 20, sensing arm 20 pivots upwardly to again position photo eye 60 properly with respect to detecting arms 40.

Referring to FIG. 7, since the detecting arms 40 encounter a new height group of bottles before sensing arm 20, if a new group of bottles to be run is shorter than the previous group, the detecting arms 40 pivot downward to block photo eye 60 before the shorter bottles 93 reach sensing arm 20.

Figure 8A:
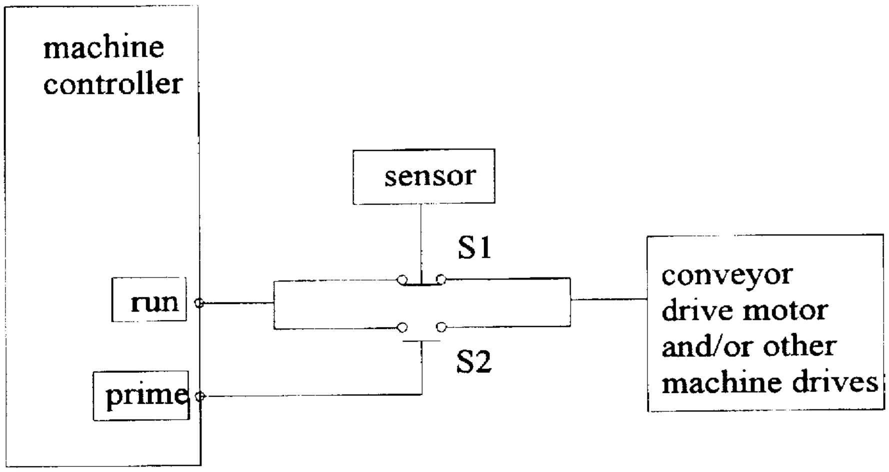
FIG. 8A is a schematic diagram showing one way the sensor and controller interact to ran a conveyor on a machine using the down article indicator of the present invention.
Figure 8B:
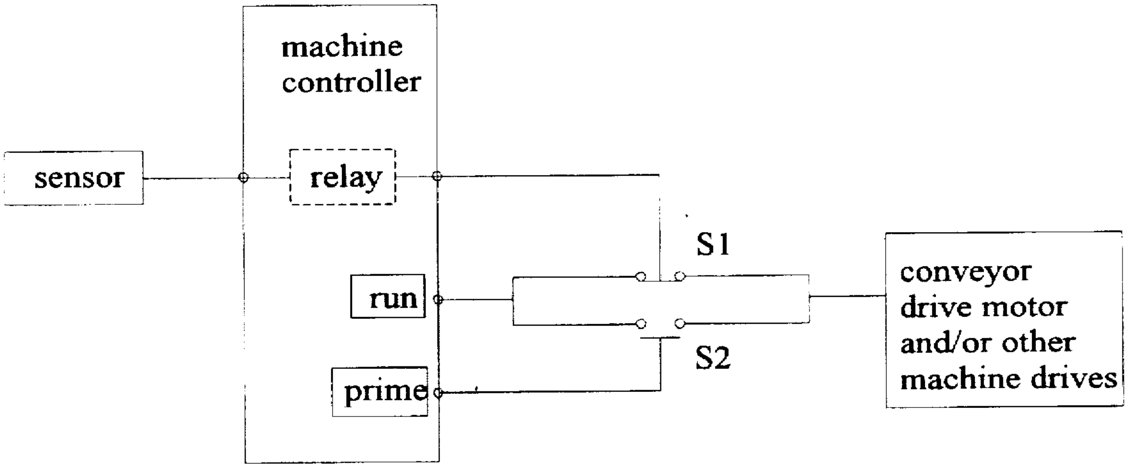
FIG. 8B is a schematic diagram showing another way the sensor and controller interact to run a conveyor on a machine using the down article indicator of the present invention.

Referring to FIGS. 7, 8A and 8B, to prevent this event from stopping the machine, the machine controller has a "prime" mode which overrides the stop signal generated by photo eye 60 while the first bottle of the new group of shorter bottles 93 advances through the down bottle indicating station. Once the first bottle of the new group has reached sensing arm 20 and caused it to pivot downward into a position which allows photo eye 60 to again be active, the machine controller can be switched back to "run" mode and normal operation resumed.

Referring to FIG. 8A, in normal operation, a "run" mode on the machine controller has switch S1 normally closed to energize conveyor and other machine drive motors. The sensor may be set up to operate switch S1 directly to open it when the sensor is tripped, thereby deenergizing the drive motors. In the preferred embodiment where the sensor is a retro-reflective photo eye, switch S1 will open when the light beam from the photo eye is interrupted. In "prime" mode, normally open switch S2 is temporarily closed so that the drives will continue to operate if switch S1 is opened by the sensor.

Referring to FIG. 8B, the sensor may also be set up to send a signal to the machine controller which then opens switch S1 through a relay.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A down article detecting apparatus for use on a machine conveying streams of articles, comprising:

(a) at least one detecting arm having a first position for contacting upright articles and at least one alternative position in the presence of a down article;

(b) a sensor constructed and arranged to sense said alternative position;

(c) means for automatically positioning said sensor relative to said at least one detecting arm to accommodate processing different height articles.

2. The apparatus of claim 1, wherein each of said at least one detecting arms has a pivot point, each detecting arm being pivotably mounted on said machine such that a portion of said detecting arm depends from said pivot point and contacts articles moving in a direction beneath said detecting arm.

3. The apparatus of claim 1, wherein said sensor is movably attached to said machine and positioned relative to said at least one detecting arms such that as all of said at least one detecting arms encounter upright articles, said sensor senses no alternative position, but if any of said detecting arms encounters a down article, said detecting arm encountering said down article moves to an alternative position and said sensor detects said alternative position.

4. The apparatus of claim 1, wherein said means for automatically positioning said sensor relative to said at least one detecting arm comprises:

(a) a sensing arm pivotably mounted on said machine down stream from said at least one detecting arm, said sensing arm having a pivot point such that a portion of said sensing arm depends from said pivot point and contacts said articles moving beneath said sensing arm; and (b) a linkage attached to said sensor and said sensing arm such that as height of a group of articles moving beneath said sensing arm changes, said sensing arm pivots about said pivot point and said linkage moves causing said sensor to move relative to said at least one detecting arm to maintain said sensor in proper position relative to said at least one detecting arm for the new height articles.

5. The apparatus of claim 1, wherein said machine has an operation control system, and said sensor sends a signal to the operation control system, said signal being used to stop said machine.

6. The apparatus of claim 5, wherein said operation control system has a selectable mode which allows said operation control system to override said signal from said sensor.

7. A self-adjusting apparatus for detecting a non-upright article for use on a machine conveying streams of articles, comprising:

(a) at least one detecting arm, each of said at least one detecting arms having a pivot point, each of said at least one detecting arms being pivotably mounted on said machine such that a portion of said detecting arm depends from said pivot point and contacts articles moving in a direction beneath said detecting arm, each of said at least one detecting arms having a first position for contacting upright articles and at least one alternative position in the presence of a non-upright article;

(b) a sensor constructed and arranged to sense said alternative position, said sensor being movably attached to said machine and positioned relative to said at least one detecting arms such that as all of said at least one detecting arms encounter upright articles, said sensor senses no alternative position, but if any of said detecting arms encounters a non-upright article, said detecting arm encountering said non-upright article pivots about said pivot point to an alternative position and said sensor detects said alternative position;

(c) a sensing arm pivotably mounted on said machine down stream from said at least one detecting arm, said sensing arm having a pivot point such that a portion of said sensing arm depends from said pivot point and contacts said articles moving beneath said sensing arm; and (d) a linkage attached to said sensor and said sensing arm such that as height of a group of articles moving beneath said sensing arm changes, said sensing arm pivots about said pivot point and said linkage moves causing said sensor to move relative to said at least one detecting arm to maintain said sensor in proper position relative to said at least one detecting arm for the new height articles.

8. The apparatus of claim 7, further comprising a sensor mount having a pivot point, said sensor being fixedly attached to said sensor mount, said sensor mount being pivotably attached to said machine and said movement of said sensor relative to said detecting arms being pivotal motion about said pivot point of said sensor mount.

9. The apparatus of claim 8, wherein said pivot point of said sensor mount and said pivot points of said at least one detecting arm are collinear.

10. The apparatus of claim 8, wherein said linkage is a rod having a first end pivotably attached to said sensor mount and a second end pivotably attached to said sensing arm.

11. The apparatus of claim 7, wherein said sensor is a photo eye, said photo eye emitting a beam of light which passes adjacent said at least one detecting arms.

12. The apparatus of claim 11, wherein said photo eye is a retro-reflective type, and further comprising a reflector attached to said machine opposite said photo eye such that said reflector reflects said beam of light back to said photo eye.

13. The apparatus of claim 12, wherein said reflector is large enough and is mounted in a position such that said light beam emitted from said photo eye will always encounter said reflector throughout all normal operating positions of said photo eye as said photo eye is moved by said linkage.

14. The apparatus of claim 7, wherein (a) said at least one detecting arms have an elongated shape and a portion of each detecting arm extends generally upward from said pivot point and interacts with said sensor; and (b) said sensing arm has an elongated shape and a portion of said sensing arm extends generally upward from said pivot point and connects with said linkage.

15. The apparatus of claim 14, wherein said sensor is a photo eye positioned so that a light beam emitted from said photo eye passes adjacent to said portion of said detecting arms extending upward from said pivot point.

16. The apparatus of claim 7, wherein said portion of said detecting arm depending from said pivot point curves upward, and said portion of said sensing arm depending from said pivot point curves upward.

17. The apparatus of claim 16, wherein said upwardly curved portion of said detecting arm and said upwardly curved portion of said sensing arm each have a flanged outer edge, said flanged outer edge extending from said curved portion normal to a plane defined by curvature of the arm.

18. The apparatus of claim 10, wherein said linkage is adjustable and said first end and said second end of said rod have threads, and further comprising two rod ends, one of said rod ends threadably engaging said threads on said first end of said rod and the other of said rod ends threadably engaging said threads of said second end of said rod.

19. The apparatus of claim 18, wherein said threads on said first end of said rod are left-hand and said threads on said second end of said rod are right-hand.

20. The apparatus of claim 8, further comprising a mounting base attached to and supporting said detecting arms, said sensing arm and said sensor mount in relative position to one another, said mounting base being attached to said machine.

21. The apparatus of claim 20, further comprising a shaft attached to said mounting base, said shaft passing through said pivot point of said detecting arms and said pivot point of said sensor mount, said detecting arms and said sensor mount pivoting on said shaft, and said shaft being mounted transversely to said mounting base.

22. A self-adjusting apparatus for detecting a non-upright article for use on a machine conveying streams of articles, comprising:

(a) a mounting base attached to said machine such that said apparatus is positioned above said articles;

(b) at least one detecting arms, each detecting arm having an elongated shape with a an upwardly curved contacting portion, a blocking portion, and a pivot point located between said blocking portion and said contacting portion, said contacting portion having a flanged outer edge, said flanged outer edge extending from said curved portion normal to a plane defined by the curvature of said detecting arm, said detecting arm being pivotably attached at said pivot point to said mounting base such that (i) said pivot points of all of said detecting arms are collinear, (ii) said blocking portion extends above said pivot point, (iii) said contacting portion depends from said pivot point, and (iv) said flanged outer edge contacts articles moving beneath said detecting arm;

(c) a sensing arm having an elongated shape with a an upwardly curved contacting portion, a connecting portion, and a pivot point located between said pivoting portion and said contacting portion, said contacting portion having a flanged outer edge, said flanged outer edge extending from said curved portion normal to a plane defined by curvature of said sensing arm, said sensing arm being pivotably attached to said mounting base down stream from said at least one detecting arms such that (i) said connecting portion extends above said pivot point, (ii) said contacting portion depends from said pivot point, and (iii) said flanged outer edge of said sensing arm contacts articles moving beneath said sensing arm;

(d) a sensor mount having a pivot point and being pivotably attached to said mounting base such that said pivot point of said sensor mount is collinear with said pivot points of said detecting arms;

(e) a retro-reflective photo eye attached to said sensor mount and positioned relative to said at least one detecting arms such that a beam of light emitted from said photo eye passes adjacent to said blocking portion of said at least one detecting arms such that as all of said at least one detecting arms encounter upright articles, none of said detecting arms break said beam of light, but as any of said detecting arms encounters a non-upright article, said detecting arm encountering said non-upright article pivots about said pivot point causing said blocking portion of said detecting arm to break said beam of light;

(f) a linkage attached to said sensor mount and said sensing arm such that as height of a group of articles moving beneath said sensing arm changes, said sensing arm pivots about said pivot point and said linkage moves causing said sensor mount to move relative to said at least one detecting arms to maintain said light beam from said photo eye in proper position relative to said at least one detecting arms for the new height articles; and (g) a reflector attached to said mounting base opposite said photo eye such that said reflector reflects said beam of light back to said photo eye, said reflector being large enough and being mounted in a position such that said light beam emitted from said photo eye will always encounter said reflector throughout all normal operating positions of said photo eye as said sensor mount is moved by said linkage.

23. A system for detecting non-upright articles on a machine conveying articles, comprising:

(a) a plurality of articles moving in a stream on said machine;

(b) a control system for controlling motion of said articles;

(c) at least one detecting arm mounted on said machine, said at least one detecting arm having a first position for contacting upright articles and at least one alternative position in the presence of a down article;

(d) a sensor movably attached to said machine and positioned relative to said at least one detecting arms such that as all of said at least one detecting arms encounter upright articles, said sensor senses no alternative position, but if any of said detecting arms encounters a down article, said detecting arm encountering said down article moves to an alternative position and said sensor detects said alternative position and sends a stop signal to said control system, thereby stopping said machine;

(e) a selectable mode on said control system which allows said operation control system to override said signal from said sensor;

(f) a sensing arm mounted on said machine down stream from said at least one detecting arms such that said sensing arm contacts said articles as said articles move; and (g) a linkage attached to said sensor and said sensing arm such that as height of a group of articles moving beneath said sensing arm changes, said sensing arm moves and said linkage moves causing said sensor to move relative to said at least one detecting arms to maintain said sensor in proper position relative to said at least one detecting arms for the new height articles.

24. The system of claim 23, wherein said articles are bottles.

25. In a device for detecting down articles traveling in a stream of conveyed articles, having at least one detecting arm having a first position for contacting upright articles and at least one alternative position in the presence of a down article and a sensor constructed and arranged to sense the alternative position, the improvement comprising a mechanism for automatically positioning the sensor relative to the at least one detecting arm to accommodate processing different height articles.

* * * * *